United States Patent
Zhang et al.

(10) Patent No.: US 12,465,071 B2
(45) Date of Patent: Nov. 11, 2025

(54) FLAVOR COMPOSITION CONTAINING D-ALLULOSE AND A PREPARATION METHOD THEREFOR

(71) Applicant: HENAN ZHONGDA HENGYUAN BIOTECHNOLOGY STOCK CO., LTD., Luohe (CN)

(72) Inventors: Wenjin Zhang, Luohe (CN); Ziheng Jin, Luohe (CN); Yanjun Wen, Luohe (CN); Linzheng Li, Luohe (CN); Xiaosong Xu, Luohe (CN); Xiaoka Hu, Luohe (CN); Yujiao Sun, Luohe (CN)

(73) Assignee: HENAN ZHONGDA HENGYUAN BIOTECHNOLOGY STOCK CO., LTD., Luohe (CN)

( * ) Notice: Subject to any disclaimer, the term of this patent is extended or adjusted under 35 U.S.C. 154(b) by 297 days.

(21) Appl. No.: 18/219,662

(22) Filed: Jul. 8, 2023

(65) Prior Publication Data
US 2024/0074475 A1   Mar. 7, 2024

(30) Foreign Application Priority Data

Sep. 2, 2022  (CN) .......................... 202211070581.7

(51) Int. Cl.
  *A23L 27/30*   (2016.01)
  *A23P 10/25*   (2016.01)
(52) U.S. Cl.
  CPC ............... *A23L 27/36* (2016.08); *A23L 27/37* (2016.08); *A23P 10/25* (2016.08)

(58) Field of Classification Search
  CPC ........... A23L 27/36; A23L 27/37; A23P 10/25
  USPC ........................................................ 426/285
  See application file for complete search history.

(56) References Cited

U.S. PATENT DOCUMENTS

2021/0009619 A1*  1/2021  Iyer .......................... C07H 3/02

FOREIGN PATENT DOCUMENTS

| CN | 111602800 A | 9/2020 | |
|---|---|---|---|
| JP | 2006527592 A | 12/2006 | |
| JP | 2010527609 A | 8/2010 | |
| JP | 2016509858 A | 4/2016 | |
| JP | 2022500085 A | 1/2022 | |
| JP | 7591868 B2 * | 11/2024 | ............... C07H 1/06 |

* cited by examiner

*Primary Examiner* — Brent T O'Hern

(57) ABSTRACT

A method of preparing a flavor composition containing D-allulose includes: (1) weighing D-allulose, mogroside, steviol glycoside and trichlorosucrose in parts by weight, and mixing them evenly to obtain a mixed powder; (2) degassing, compressing, and rolling the mixed powder, and extruding the raw materials into flakes; and (3) crushing and granulating the shaped flakes to obtain the flavor composition. D-allulose is used as the main raw material, and added high-intensity sweeteners as auxiliary raw materials. After the raw materials are mixed evenly, dry granulation is adopted, and the powder is degassed and pre-compressed by using the crystal water in the raw materials, and squeezed by a hydraulic roller to form a bonding force between the various sweetener molecules to form flakes, and the flakes are processed by processes such as crushing and granulating to obtain the flavor composition granules containing D-allulose with the various sweeteners integrated uniformly as a whole.

1 Claim, 1 Drawing Sheet

A sensory evaluation radar chart of examples and sucrose, D-allulose, mogroside, and steviol glycoside

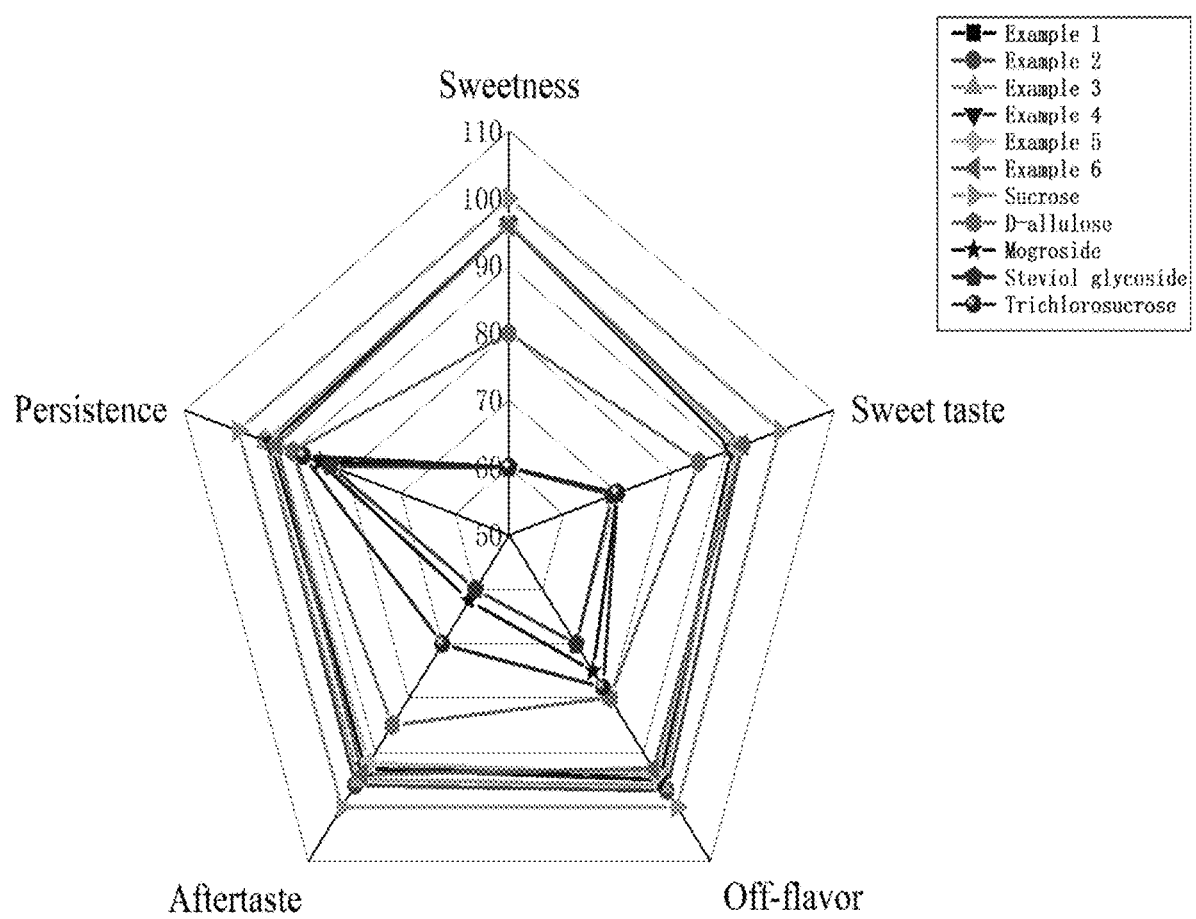
A sensory evaluation radar chart of examples and sucrose, D-allulose, mogroside, and steviol glycoside

FLAVOR COMPOSITION CONTAINING D-ALLULOSE AND A PREPARATION METHOD THEREFOR

This application claims priority to Chinese Patent Application No. 202211070581.7, filed on Sep. 2, 2022, which is incorporated by reference for all purposes as if fully set forth herein.

TECHNICAL FIELD

The invention belongs to the field of food processing, and in particular relates to a flavor composition containing D-allulose and a preparation method therefor.

BACKGROUND

D-allulose, CAS number: 551-68-8, molecular formula $C_6H_{12}O_6$, molecular weight: 180.16, belongs to ketohexose, is an important member of the rare sugar family, is a white powder crystal, is soluble in water, methanol, ethanol, etc., and is the C-3 epimer of D-fructose. In nature, D-allulose exists in sugarcane, wheat, and the genus *Itea* in a very small amount and is a new type of functional monosaccharide with special health care functions.

D-allulose has a sweetness that is equivalent to 70% of that of sucrose, and calories that are equivalent to 0.3% of that of sucrose, and has similar taste and volume characteristics to sucrose, and can undergo Maillard reaction with amino acids or proteins in food. Some foreign scholars used rats and dogs as research objects to verify the food safety of D-allulose, and the results showed that allulose has no adverse effects on their health. Therefore, D-allulose is classified as a conventional carbohydrate substitute and does not pose any safety concerns.

According to the nutrition labeling rules issued by the US FDA in 2016, allulose needs to be comprised in the total carbohydrates, total sugars and added sugars in the nutrition label. However, in April 2019, the FDA announced the exclusion of D-allulose from the "added sugars" and "total sugars" labels, and agreed to calculate 0.4 calories per gram of allulose, making it a new type of sweetener with low calories and high sweetness.

With the development of society and the improvement of people's living standards in the new era, more and more people's understanding of sugar has undergone major changes, and sugar has also changed from a nutritional supplement to a culprit of diseases; In 2015, WHO proposed that free sugars are associated with poor diet quality, obesity, and the risk of non-communicable diseases. The 2021 Dietary Guidelines for Chinese Residents also mentioned that excessive consumption of added sugar would increase the risk of dental caries, diabetes, and obesity.

Fear of sugar has been reflected in consumer behavior. The public believes that "sugar-free" products taste good, are healthy and cost-effective. Therefore, in recent years, sugar reduction, sugar substitution, and sugar-free products have become a development trend. D-allulose, as the fourth-generation new sweetener with low-calorie and high-sweetness, can widely replace traditional sweeteners. In some conventional food fields such as beverages, baking, candy, dairy products, and frozen foods, D-allulose has attracted more and more attention and popularity from food business personnel and consumers. D-allulose can not only improve the gelation degree of food, but also react with proteins in food to improve the flavor of food.

In the prior art, in order to pursue safe, healthy, low-sugar, and low-energy sweetener compositions, people often mix high-intensity sweeteners and low-intensity sweeteners together in the production process make up for the difference in nutritional components between different sweeteners and generate the effect of complementary advantages so as to prepare a sweetener which is safe, low in calorie, high in sweetness, small in dosage, convenient to use, and capable of replacing sucrose without generating burden.

However, the conventional method is to improve the mixing uniformity between high-intensity sweeteners and low-intensity sweeteners, and the product is usually prepared by wet mixing granulation and one-step boiling granulation. However, both methods have major problems. For example, the wet mixing granulation method, due to the high hygroscopicity of the material, is easy to cause agglomeration during the powder pretreatment, resulting in uneven mixing. In addition, the moisture content of the material is high, and the roller compacted granules are easy to stick to the roller shaft and the screen, and the operation is difficult to control, which reduces the yield and output. During the extrusion process, the friction between the material and the screen would cause the material to melt into a viscous massecuite, affecting product performance. In the one-step boiling granulation method, the material is in contact with the binder under the action of airflow, and gradually forms irregular granules of different sizes. However, since the boiling state of the material is irregular, with the development of granulating process, the difference of irregular granules would be gradually increased with the increase of granule size, and the mixing uniformity would be significantly decreased. Moreover, when the same amount of material is granulated, compared with other methods, there are many problems such as large dust, large environmental pollution, poor continuous production capacity, low yield, and low output when using the one-step boiling granulation method.

Therefore, the problem to be solved by the technical personnel in the field is to design a method which can not only avoid agglomeration but also maintain the mixing uniformity when the sweeteners with different intensity are mixed evenly, thereby obtaining a flavor composition containing the D-allulose with good product performance.

SUMMARY OF THE INVENTION

The object of the present invention is to provide a method for preparing a flavor composition containing D-allulose, which takes D-allulose as the main raw material, and the added high-intensity sweeteners such as mogroside, steviol glycoside, and trichlorosucrose as auxiliary raw materials. A method for preparing a composite sweetener comprises dry granulation after uniformly mixing D-allulose and high-intensity sweetener and can effectively solve the problem of uneven mixing of high-intensity sweeteners and low-intensity sweeteners in the prior art.

The preparation method of the present invention has simple process, no special limitation on the devices used, low requirements on reaction conditions and energy consumption, strong operability, and good universality, and is very suitable for large-scale industrial production operations.

In order to achieve the above objective, the present invention provides a method for preparing a flavor composition containing D-allulose, the method comprises the following steps:

(1) weighing D-allulose, mogroside, steviol glycoside and trichlorosucrose in parts by weight, and mixing them evenly to obtain a mixed powder;

(2) degassing, compressing, and rolling the mixed powder, and extruding the raw materials into flakes;

and (3) crushing and granulating the shaped flakes to obtain the flavor composition containing D-allulose.

In a preferred embodiment, in step (1), the following components are comprised in parts by weight: 60-90 parts of D-allulose, 1-20 parts of mogroside, 1-20 parts of steviol glycoside, and 1-20 parts of trichlorosucrose.

In a preferred embodiment, in step (1), the total weight part of D-allulose, mogroside, steviol glycoside and trichlorosucrose is 100 parts.

In a preferred embodiment, in step (1), the following components are comprised in parts by weight: 70-85 parts of D-allulose, 2-8 parts of mogroside, 1-10 parts of steviol glycoside, and 5-20 parts of trichlorosucrose.

In a preferred embodiment, in step (1), the following components are comprised in parts by weight: 85 parts of D-allulose, 4 parts of mogroside, 3.5 parts of steviol glycoside, and 7.5 parts of trichlorosucrose.

In a preferred embodiment, in step (1), the mesh size of the D-allulose is 80-140 mesh, and the mesh size of the trichlorosucrose is 80-140 mesh.

In a preferred embodiment, in step (1), the mesh size of the mogroside is 80-140 mesh, and the mogroside V content in the mogroside is 20-60%.

In a preferred embodiment, in step (1), the mesh size of the steviol glycoside is 80-200 mesh, and the rebaudioside A content in the steviol glycoside is 90%.

In a preferred embodiment, in step (2), the condition for degassing is: a temperature of 20° C. to 50° C., a vacuum degree of −0.06 MPa to −0.08 MPa, a duration time of 10 min to 20 min;

the condition for pre-compressing is: a rotation speed of extrusion twin screw of 10-60 rpm;

the condition for rolling is: a pressure of 3-15 kN/cm, a rotation speed of 20-60 rpm, and the cooling water temperature of a roller of 10-35° C.

Another object of the present invention is to provide a flavoring composition containing D-allulose. The composite sweetener is compounded by D-allulose and other high-intensity sweeteners, and the powder is degassed and pre-compressed by using the crystal water in the raw materials, and squeezed by a hydraulic roller to form a bonding force between the various sweetener molecules to form flakes, and then the flakes are processed by processes such as crushing and granulating to obtain the composite sweetener granules with the various sweeteners integrated uniformly as a whole.

The flavor composition containing D-allulose prepared by the method of the present invention can replace sucrose or reduce the content and dosage of sucrose in and reduce calories of beverages, candies, bakery, dairy products, etc., so that the sweet food produced by the flavor composition is better, safer, and lower in burden, and meanwhile, people's demands for safety, health and taste are met.

Compared with the prior art, the technical solution of the present invention has the following advantages:

(1) The present invention adopts suitable D-allulose with low-calorie and mogroside, steviol glycoside, and trichlorosucrose to composite to obtain a safe, healthy, low-calorie composite sweetener, which can replace sucrose, has softer and more refreshing taste, and relieve the sweet and greasy flavor of the sucrose. The combination of several sweeteners can effectively play their respective advantages, making them have complementary effects, satisfying people's favorite sweet taste for food and beverages without need to worry about the problems caused by the intake of sucrose, and the composite sweetener is especially suitable for patients with diabetes.

(2) The composite sweetener provided by the present invention can not only completely replace sucrose, but also has lower usage amount than the sucrose. The minimum amount of the composite sweetener only needs 1% of the amount of sucrose to achieve the same sweetness effect.

(3) The composite sweetener in the present invention has no side effects (diarrhea, etc.) brought by other sugar alcohols, and is low in calories and good in solubility. The main component D-allulose has the beneficial effects of inhibiting the activity of α-glucosidase, affecting blood glucose metabolism, inhibiting fatty liver enzyme, and affecting lipid metabolism.

(4) The dry granulation method used in the present invention solves the problem of mixing uniformity between high-intensity and low-intensity sweeteners in the past, and can integrate them into a whole to make them have better solubility through granulation.

(5) The dry granulation method adopted in the present invention realizes the material granulation operation which cannot be completed by wet mixing granulation and one-step boiling granulation in the past.

BRIEF DESCRIPTION OF THE DRAWING

FIG. 1 is a sensory evaluation radar chart of examples and sucrose, D-allulose, mogroside, and steviol glycoside.

DETAILED DESCRIPTION OF EMBODIMENTS

In order to enable those skilled in the art to better understand the present invention, the present invention will be described in further detail below in conjunction with the accompanying drawings and specific embodiments, but it should be understood that the protection scope of the present invention is not limited by the specific embodiments.

The embodiments of the present invention solve the problem of poor mixing uniformity between high-intensity sweeteners and low-intensity sweeteners in the prior art by providing a flavor composition containing D-allulose and a preparation method therefor.

The technical solution in the present invention is to solve the above problems, and the general train of thought is as follows:

The present invention provides a method for preparing a flavor composition containing D-allulose, the method comprises the following steps:

(1) weighing D-allulose, mogroside, steviol glycoside and trichlorosucrose in parts by weight, and mixing them evenly to obtain a mixed powder;

(2) degassing, compressing, and rolling the mixed powder, and extruding the raw materials into flakes;

and (3) crushing and granulating the shaped flakes to obtain the flavor composition containing D-allulose.

In a preferred embodiment, in step (1), the following components are comprised in parts by weight: 60-90 parts of D-allulose, 1-20 parts of mogroside, 1-20 parts of steviol glycoside, and 1-20 parts of trichlorosucrose; more preferably, in step (1), the total weight part of D-allulose, mogroside, steviol glycoside and trichlorosucrose is 100 parts.

In the present invention, the mogroside used is the sweet component of *Siraitia grosvenorii*. Mogroside, also known as Momordica-Glycosides (or lo-han-kuo extract), has a high content in plants and good water solubility. There are finished products with a purity of more than 98% used as food additives. Mogroside is widely extracted from Guangxi's specialty economic plant—*Siraitia grosvenorii*. Mogroside's sweetness is 300 times that of sucrose, and its calories are zero. Mogroside has the effects of clearing away heat, moistening lungs, antitussive, and laxative. Mogroside can be used for preventing and treating obesity, constipation, diabetes, etc. and is a low-calorie, non-nutritive, non-fermentative sweetener. Moreover, mogroside has stable properties and would not be destroyed by continuous heating in 100° C. neutral aqueous solution for 25 hours or prolonged heating at 120° C. Mogroside would not deteriorate in weak acid and weak alkali. In addition, mogroside is safe and non-toxic as a food. It is stipulated in the national mandatory standard "GB2760 Food Additive Use Standards" that mogroside can be used in various foods without limit. In the present invention, mogroside can not only provide the effect of low calorie and high sweetness, but also has certain health care function, and is safe and non-toxic, and can be widely used in place of sucrose in the food field.

In the present invention, another raw material used is steviol glycoside with the chemical formula of $C_{38}H_{60}O_{18}$, which is a glycoside extracted from leaves of stevia of Compositae with slight astringency. Stevia is native to Paraguay and Brazil. It has the characteristics of high sweetness and low calorie. Its sweetness is 200-300 times that of sucrose, and its calorific value is only 1/300 of that of sucrose. Rebaudioside A in steviol glycosides has obvious bitterness and a certain degree of astringency and menthol taste, and its taste characteristics are worse than steviolbioside A. Rebaudioside A is moderately delicious, and has less aftertaste, so rebaudioside A is the natural sweetener that is closest to granulated sugar. But there would be a sense of off-flavor when the concentration is high. Stevioside is stable in acid and salt solutions, and has relatively stable properties at room temperature. Stevioside is easily soluble in water, absorbs moisture quickly in the air, and has a solubility of more than 40% at room temperature. The combination of stevioside and citric acid or glycine tastes good; when combined with other sweeteners such as sucrose and fructose, the taste is also good. Stevioside is not absorbed after eating and does not produce calories, so it is a good natural sweetener for diabetics and obese patients.

In the present invention, another raw material used is trichlorosucrose, commonly known as sucralose, which is a high-intensity sweetener with a molecular formula of $C_{12}H_{19}Cl_3O_8$. Trichlorosucrose has the characteristics of odorless and hygroscopic, high thermal stability. easily soluble in water and can be dissolved in organic solvents such as ethanol and methanol. The solubility at room temperature of 28° C. is 28.2 g. Trichlorosucrose has high stability in light environment, thermal environment, and pH value variation. The aqueous solution of trichlorosucrose is clear and transparent, has a pH of 5 and high stability, and there would be no chemical changes after storage for more than 1 year. The crystals would not undergo chemical changes after storage for about 4 years, and high temperature conditions would not change the sweetness. The sweetness of trichlorosucrose is very high (400-800 times that of sucrose), and the sweetness is pure. The presentation speed of sweet taste, the feeling intensity of maximum sweetness, the duration of sweetness and aftertaste are all very close to those of sucrose. Trichlorosucrose is a derivative of sucrose, a pure natural product. The sweetness relative to sucrose varies with the concentration of the solution. Trichlorosucrose has a desalination effect on sour and salty tastes, and has a masking effect on astringent, bitter, wine, and other tastes, has an enhancing effect on spicy, milk taste, etc. In addition, trichlorosucrose does not participate in metabolism in the human body, is not absorbed by the human body, has zero calorie value and is an ideal sweet substitute for diabetics. Approved by the FDA in 1998, trichlorosucrose can be used as a general sweetener for all foods without affecting the concentration of glucose in the blood and can be accepted by diabetics. Moreover, trichlorosucrose is not utilized by dental caries bacteria, and can reduce the amount of acid produced by bacteria in the oral cavity and the adhesion of streptococcal cells on the tooth surface, effectively preventing dental caries. Animal studies have shown that trichlorosucrose is also safe for consistent, long-term consumption in a large dose that is hundreds of times the level of human use. Long-term experiments on ordinary human volunteers have shown that trichlorosucrose does not have irreversible effects on human health. After a long-term safety certification test, the US FDA confirmed that trichlorosucrose is a GRAS (safety) level additive.

It can be seen that the high-intensity sweeteners mogroside, steviol glycoside and trichlorosucrose used in the present invention all have the advantages of high sweetness, low calorie, high biological safety, and good stability. Compounding the low-intensity sweetener D-allulose, which is mainly used in the present invention and whose sweetness is equivalent to 70% of sucrose, can effectively make up for the difference in nutritional components between different sweeteners and generate the effect of complementary advantages. Thereby, a composite sweetener with high safety, low calorie, high sweetness, and less dosage of use, which effectively replaces sucrose can be prepared.

In a preferred embodiment, in step (1), the following components are comprised in parts by weight: 70-85 parts of D-allulose, 2-8 parts of mogroside, 1-10 parts of steviol glycoside, and 5-20 parts of trichlorosucrose.

In a preferred embodiment, in step (1), the following components are comprised in parts by weight: 85 parts of D-allulose, 4 parts of mogroside, 3.5 parts of steviol glycoside, and 7.5 parts of trichlorosucrose.

In a preferred embodiment, in step (1), the mesh size of the D-allulose is 80-140 mesh, and the mesh size of the trichlorosucrose is 80-140 mesh.

In a preferred embodiment, in step (1), the mesh size of the mogroside is 80-140 mesh, and the mogroside V content in the mogroside is 20-60%.

In a preferred embodiment, in step (1), the mesh size of the steviol glycoside is 80-200 mesh, and the rebaudioside A content in the steviol glycoside is 90%.

In the preparation process of the present invention, through a large number of experiments, it is found that controlling the particle size of raw materials and the content of sweet components within the above range is more conducive to dry granulation operations, reduces the energy consumption during degassing and rolling, and improves the stability of the flavor composition containing D-allulose.

In a preferred embodiment,
in step (2), the condition for degassing is: a temperature of 20° C. to 50° C., a vacuum degree of −0.06 MPa to −0.08 MPa, a duration time of 10 min to 20 min;
the condition for pre-compressing is: a rotation speed of extrusion twin screw of 10-60 rpm;
the condition for rolling is: a pressure of 3-15 kN/cm, a rotation speed of 20-60 rpm, and the cooling water temperature of a roller of 10-35° C.

In a preferred embodiment, in step (3), the granulating comprises the following steps:

under extrusion, the small granules pass through the orifice plate of the granulator, and the large granules are squeezed and broken into small granules. After the required mesh size is completed, the coarse granules and fine powder are removed using a vibrating sieve, and the granular material obtained by separation is the flavor composition containing D-allulose.

In a preferred embodiment, in step (3), the required mesh size is 5-60 mesh, more preferably, the required mesh size is 20-40 mesh.

Another object of the present invention is to provide a flavor composition containing D-allulose.

The technical solution of the present application is described in detail below by specific examples:

If not specified, the technical means used in the present invention are conventional means well known to those skilled in the art, and various raw materials, reagents, instruments, equipments, etc. used in the present invention can be purchased through the market or can be prepared by existing methods.

In the present invention, parts by weight can be μg, mg, g, kg, and other well-known weight units in the art, and can also be multiples thereof, such as $\frac{1}{10}$, $\frac{1}{100}$, 10 times, 100 times, etc.

Example 1

(1) D-allulose was crushed and passed through a 120-mesh sieve; trichlorosucrose was crushed and passed through a 120-mesh sieve; mogroside was crushed and passed through a 100-mesh sieve; steviol glycoside was crushed and passed through a 120-mesh sieve;
(2) 900 g of D-allulose, 30 g of mogroside, 20 g of steviol glycoside, and 50 g of trichlorosucrose were taken and mixed evenly with a three-dimensional mixer;
(3) The mixed composite sweetener was pumped into a degassing tank, the feed valve was closed, degassing was performed at −0.07 Mpa at 25° C. for 15 minutes. After the degassing tank was depressurized, the horizontal twin-screw extrusion motor was turned on, and the rotation speed was 30 rpm. The discharge door at the bottom of the degassing tank was opened, and the powder was sent into the horizontal twin-screw channel at a uniform speed. The powder was extruded by the twin-screw to form a semi-soft dough cake, and the obtained dough cake was added to the inlet of a horizontal roller shaft through the twin-screw channel;
(4) The rolling motor was turned on, the rotation speed was adjusted to 40 rpm, and the pressure was adjusted to 9 kN/cm, and the cooling or chilled water cooling was turned on at the same time, so that the rolling is uniform and stable, and a formed compressed flake was obtained;
(5) The formed compressed flake was granulated into small granules through an oscillating granulator, and the mesh number was controlled to 20 mesh, so that a uniform composite flavoring product can be obtained.

Example 2

(1) D-allulose was crushed and passed through a 120-mesh sieve; trichlorosucrose was crushed and passed through a 120-mesh sieve; mogroside was crushed and passed through a 100-mesh sieve; steviol glycoside was crushed and passed through a 120-mesh sieve;
(2) 850 g of D-allulose, 40 g of mogroside, 35 g of steviol glycoside, and 75 g of trichlorosucrose were taken and mixed evenly with a three-dimensional mixer;
(3) The mixed composite sweetener was pumped into a degassing tank, the feed valve was closed, degassing was performed at −0.06 Mpa at 25° C. for 20 minutes. After the degassing tank was depressurized, the horizontal twin-screw extrusion motor was turned on, and the rotation speed was 20 rpm. The discharge door at the bottom of the degassing tank was opened, and the powder was sent into the horizontal twin-screw channel at a uniform speed. The powder was extruded by the twin-screw to form a semi-soft dough cake, and the obtained dough cake was added to the inlet of a horizontal roller shaft through the twin-screw channel;
(4) The rolling motor was turned on, the rotation speed of the roller shaft was adjusted to 22 rpm, and the pressure was adjusted to 5 kN/cm, and the cooling or chilled water cooling was turned on at the same time, so that the rolling is uniform and stable, and a formed compressed flake was obtained;
(5) The formed compressed flake was granulated into small granules through an oscillating granulator, and the mesh number was controlled to 20 mesh, so that a uniform composite flavoring product can be obtained.

Example 3

(1) D-allulose was crushed and passed through a 120-mesh sieve; trichlorosucrose was crushed and passed through a 120-mesh sieve; mogroside was crushed and passed through a 100-mesh sieve; steviol glycoside was crushed and passed through a 120-mesh sieve;
(2) 800 g of D-allulose, 45 g of mogroside, 55 g of steviol glycoside, and 100 g of trichlorosucrose were taken and mixed evenly with a three-dimensional mixer;
(3) The mixed composite sweetener was pumped into a degassing tank, the feed valve was closed, degassing was performed at −0.06 Mpa at 30° C. for 15 minutes. After the degassing tank was depressurized, the horizontal twin-screw extrusion motor was turned on, and the rotation speed was 25 rpm. The discharge door at the bottom of the degassing tank was opened, and the powder was sent into the horizontal twin-screw channel at a uniform speed. The powder was extruded by the twin-screw to form a semi-soft dough cake, and the obtained dough cake was added to the inlet of a horizontal roller shaft through the twin-screw channel;
(4) The rolling motor was turned on, the rotation speed was adjusted to 30 rpm, and the pressure was adjusted to 8 kN/cm, and the cooling or chilled water cooling was turned on at the same time, so that the rolling is uniform and stable, and a formed compressed flake was obtained;
(5) The formed compressed flake was granulated into small granules through an oscillating granulator, and the mesh number was controlled to 20 mesh, so that a uniform composite flavoring product can be obtained.

Example 4

(1) D-allulose was crushed and passed through a 120-mesh sieve; trichlorosucrose was crushed and passed through a 120-mesh sieve; mogroside was crushed and passed through a 100-mesh sieve; steviol glycoside was crushed and passed through a 120-mesh sieve;

(2) 750 g of D-allulose, 60 g of mogroside, 65 g of steviol glycoside, and 125 g of trichlorosucrose were taken and mixed evenly with a three-dimensional mixer;

(3) The mixed composite sweetener was pumped into a degassing tank, the feed valve was closed, degassing was performed at −0.07 Mpa at 35° C. for 15 minutes. After the degassing tank was depressurized, the horizontal twin-screw extrusion motor was turned on, and the rotation speed was 30 rpm. The discharge door at the bottom of the degassing tank was opened, and the powder was sent into the horizontal twin-screw channel at a uniform speed. The powder was extruded by the twin-screw to form a semi-soft dough cake, and the obtained dough cake was added to the inlet of a horizontal roller shaft through the twin-screw channel;

(4) The rolling motor was turned on, the rotation speed was adjusted to 35 rpm, and the pressure was adjusted to 9 kN/cm, and the cooling or chilled water cooling was turned on at the same time, so that the rolling is uniform and stable, and a formed compressed flake was obtained;

(5) The formed compressed flake was granulated into small granules through an oscillating granulator, and the mesh number was controlled to 20 mesh, so that a uniform composite flavoring product can be obtained.

Example 5

(1) D-allulose was crushed and passed through a 120-mesh sieve; trichlorosucrose was crushed and passed through a 120-mesh sieve; mogroside was crushed and passed through a 100-mesh sieve; steviol glycoside was crushed and passed through a 120-mesh sieve;

(2) 700 g of D-allulose, 75 g of mogroside, 70 g of steviol glycoside, and 155 g of trichlorosucrose were taken and mixed evenly with a three-dimensional mixer;

(3) The mixed composite sweetener was pumped into a degassing tank, the feed valve was closed, degassing was performed at −0.07 Mpa at 30° C. for 12 minutes. After the degassing tank was depressurized, the horizontal twin-screw extrusion motor was turned on, and the rotation speed was 40 rpm. The discharge door at the bottom of the degassing tank was opened, and the powder was sent into the horizontal twin-screw channel at a uniform speed. The powder was extruded by the twin-screw to form a semi-soft dough cake, and the obtained dough cake was added to the inlet of a horizontal roller shaft through the twin-screw channel;

(4) The rolling motor was turned on, the rotation speed was adjusted to 42 rpm, and the pressure was adjusted to 10 kN/cm, and the cooling or chilled water cooling was turned on at the same time, so that the rolling is uniform and stable, and a formed compressed flake was obtained;

(5) The formed compressed flake was granulated into small granules through an oscillating granulator, and the mesh number was controlled to 20 mesh, so that a uniform composite flavoring product can be obtained.

Example 6

(1) D-allulose was crushed and passed through a 120-mesh sieve; trichlorosucrose was crushed and passed through a 120-mesh sieve; mogroside was crushed and passed through a 100-mesh sieve; steviol glycoside was crushed and passed through a 120-mesh sieve;

(2) 600 g of D-allulose, 120 g of mogroside, 100 g of steviol glycoside, and 180 g of trichlorosucrose were taken and mixed evenly with a three-dimensional mixer;

(3) The mixed composite sweetener was pumped into a degassing tank, the feed valve was closed, degassing was performed at −0.08 Mpa at 40° C. for 10 minutes. After the degassing tank was depressurized, the horizontal twin-screw extrusion motor was turned on, and the rotation speed was 50 rpm. The discharge door at the bottom of the degassing tank was opened, and the powder was sent into the horizontal twin-screw channel at a uniform speed. The powder was extruded by the twin-screw to form a semi-soft dough cake, and the obtained dough cake was added to the inlet of a horizontal roller shaft through the twin-screw channel;

(4) The rolling motor was turned on, the rotation speed was adjusted to 55 rpm, and the pressure was adjusted to 15 kN/cm, and the cooling or chilled water cooling was turned on at the same time, so that the rolling is uniform and stable, and a formed compressed flake was obtained;

(5) The formed compressed flake was granulated into small granules through an oscillating granulator, and the mesh number was controlled to 20 mesh, so that a uniform composite flavoring product can be obtained.

Effect Example

The main performance indexes of the composite sweeteners prepared in Examples 1-6 were tested, and the results are shown in Table 1:

TABLE 1

Key performance indexes of composite sweeteners

| Test item | Particle size | Sweetness equivalent to sucrose | Appearance |
|---|---|---|---|
| Example 1 | 20-40 mesh | 40 | White granules integrated uniformly as a whole |
| Example 2 | 20-40 mesh | 60 | White granules integrated uniformly as a whole |
| Example 3 | 20-40 mesh | 80 | White granules integrated uniformly as a whole |
| Example 4 | 20-40 mesh | 100 | Milky white granules integrated uniformly as a whole |
| Example 5 | 20-40 mesh | 121 | Light yellowish granules integrated uniformly as a whole |
| Example 6 | 20-40 mesh | 152 | Light yellow granules integrated uniformly as a whole |

The sweetness, sweet taste, off-flavor, aftertaste, persistence, and total sweetness score of the formula of the sweetener composition of Examples 1-6 and sucrose, D-allulose, mogroside, and steviol glycoside are shown in table 2 (the sensory evaluation radar chart is shown in FIG. 1):

TABLE 2

Evaluation Score Sheet

| Test item | Sweetness | Sweet taste | Off-flavor | Aftertaste | Persistence | Total sweetness score |
|---|---|---|---|---|---|---|
| Sucrose | 100 | 100 | 100 | 100 | 100 | 100 |
| Example 1 | 96 | 92 | 94 | 93 | 93 | 93.6 |
| Example 2 | 96 | 93 | 97 | 96 | 95 | 95.4 |
| Example 3 | 96 | 91 | 96 | 95 | 95 | 94.6 |
| Example 4 | 96 | 91 | 95 | 93 | 94 | 93.8 |
| Example 5 | 96 | 92 | 94 | 92 | 93 | 93.4 |
| Example 6 | 96 | 93 | 94 | 93 | 93 | 93.8 |
| D-allulose | 80 | 85 | 80 | 85 | 90 | 84 |
| Mogroside | 60 | 70 | 75 | 62 | 85 | 70.4 |
| Steviol glycoside | 60 | 69 | 70 | 60 | 83 | 68.4 |
| Trichlorosucrose | 60 | 70 | 78 | 70 | 88 | 73.2 |

It can be seen from the evaluation results in Table 2 that the total average score of the D-allulose-containing sweetener composition of Examples 1-6 of the present invention is about 94 points, and the sweetener composition can effectively make up for the difference in nutritional components between different sweeteners and generate the effect of complementary advantages, thus preparing the sweetener composition with high safety, low calorie, high sweetness and low dosage of use, which can effectively replace sucrose, and can be applied to the technical field of food processing.

The foregoing descriptions of specific exemplary embodiments of the present invention have been presented for purposes of explanation and illustration. These descriptions are not intended to limit the invention to the precise form disclosed, and obviously many modifications and variations can be made in light of the above teaching. The purpose of selection and description of the exemplary embodiments is to explain the specific principles of the invention and its practical application, thereby enabling those skilled in the art to realize and utilize various exemplary embodiments of the invention, as well as various selections and modifications. It is intended that the scope of the invention is to be defined by the claims and their equivalents.

The invention claimed is:

1. A method for preparing a flavor composition containing D-allulose, characterized in that, the method comprises the following steps:

(1) weighing D-allulose, mogroside, steviol glycoside and trichlorosucrose in parts by weight, and mixing them evenly to obtain a mixed powder;
(2) degassing, compressing, and rolling the mixed powder, and extruding the mixed powder into flakes; and
(3) crushing and granulating the flakes to obtain the flavor composition containing D-allulose, wherein in the step (1), the following components are comprised in parts by weight: 85 parts of the D-allulose, 4 parts of the mogroside, 3.5 parts of the steviol glycoside, and 7.5 parts of the trichlorosucrose; the total weight part of the D-allulose, mogroside, the steviol glycoside and the trichlorosucrose is 100 parts; a mesh size of the D-allulose is 80-140 mesh, and a mesh size of the trichlorosucrose is 80-140 mesh; a mesh size of the mogroside is 80-140 mesh, and a mogroside V content in the mogroside is 20-60%; and a mesh size of the steviol glycoside is 80-200 mesh, and a rebaudioside A content in the steviol glycoside is 90%; and wherein in the step (2), the condition for the degassing is: a temperature of 20° C. to 50° C., a vacuum degree of -0.06 MPa to -0.08 MPa, a duration time of 10 min to 20 min; a condition for pre-compressing is: a rotation speed of extrusion twin screw of 10-60 rpm; and a condition for rolling is: a pressure of 3-15 kN/cm, a rotation speed of 20-60 rpm, and a cooling water temperature of a roller of 10-35° C.

\* \* \* \* \*